United States Patent [19]

Freeman

[11] 4,174,120
[45] Nov. 13, 1979

[54] BICYCLE CART ATTACHMENT

[76] Inventor: Anthony L. Freeman, 1143 5th St., Washington, D.C. 20001

[21] Appl. No.: 865,179

[22] Filed: Dec. 28, 1977

[51] Int. Cl.² .............................................. B62J 7/04
[52] U.S. Cl. ................................. 280/204; 280/491 B; 280/511
[58] Field of Search .............. 280/202, 204, 292, 504, 280/511, 491 B, 491 R

[56] References Cited

U.S. PATENT DOCUMENTS

| | | | |
|---|---|---|---|
| 559,761 | 5/1896 | Trancle-Armand | 280/204 |
| 3,598,426 | 8/1971 | Spiese | 280/204 |
| 3,664,687 | 5/1972 | Nutt, Jr. et al. | 280/491 B |
| 3,848,890 | 11/1974 | MacAlpine | 280/204 |
| 3,861,714 | 1/1975 | Evans et al. | 280/202 |
| 3,993,321 | 11/1976 | Cote | 280/204 |
| 4,037,853 | 7/1977 | Sparks | 280/204 |

*Primary Examiner*—Joseph F. Peters, Jr.
*Assistant Examiner*—Michael Mar
*Attorney, Agent, or Firm*—John B. Dickman, III

[57] ABSTRACT

An attachment for bicycles which allows a wheeled shopping cart to be towed behind a conventional bicycle with universal pivoting and turning means to take care of uneven terrain, cornering and other movements which a vehicle-towed device may be subject to.

1 Claim, 5 Drawing Figures

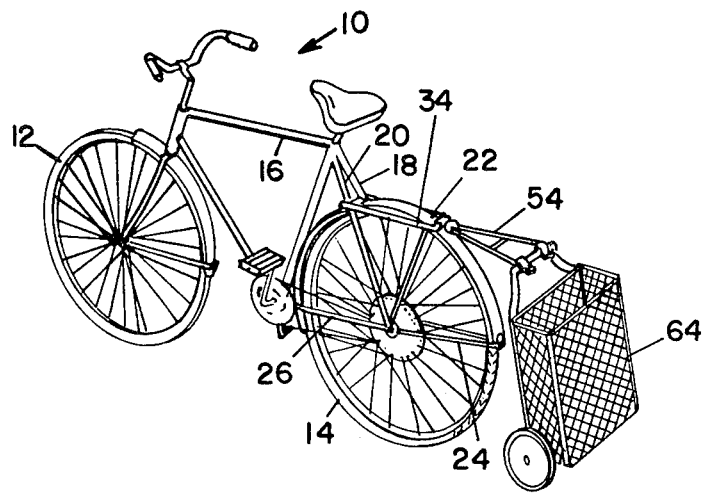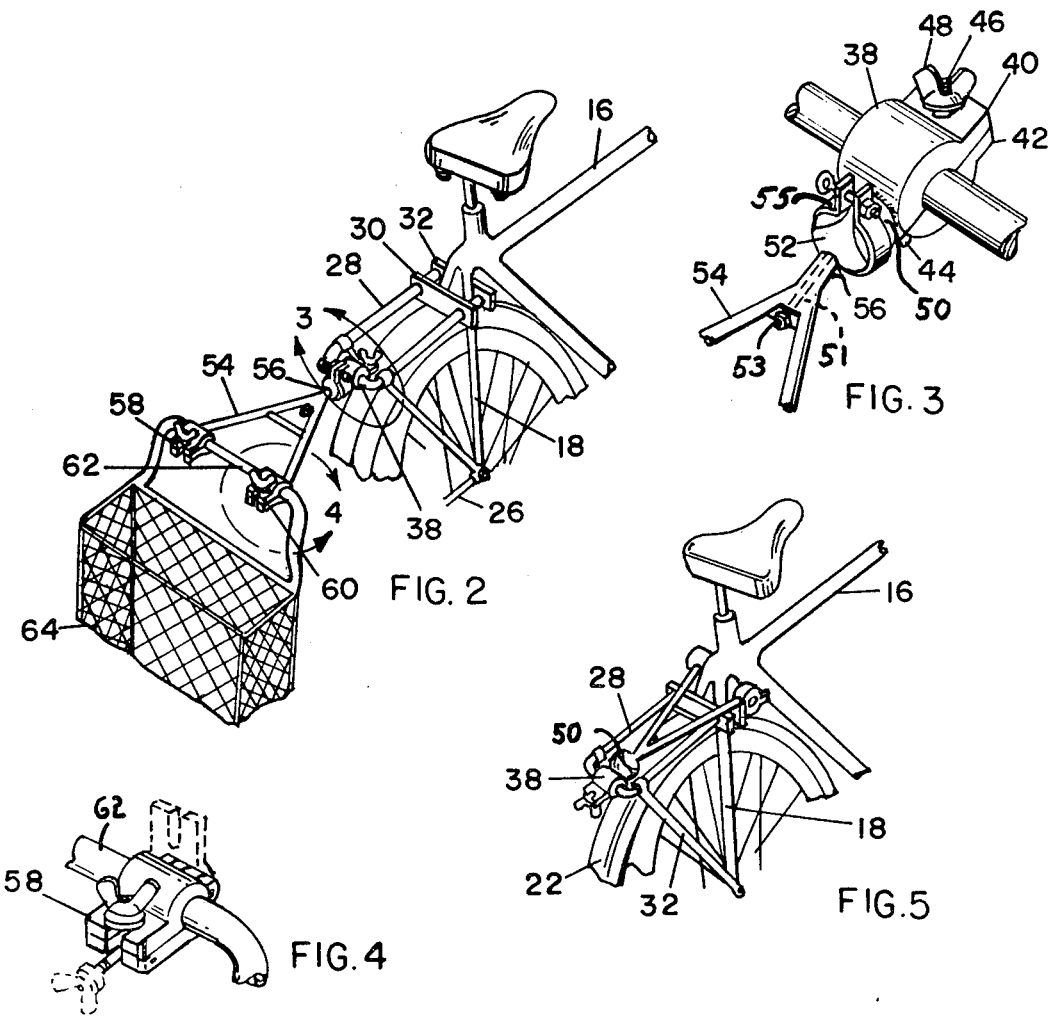

BICYCLE CART ATTACHMENT

BACKGROUND OF THE INVENTION

The present upsurge in bicycling, for health, gasoline saving and other reasons, has resulted in a dilemma for people who wish to shop by bicycle and cannot carry their purchases in their arms or in various carriers, baskets, etc., that are attached to the bicycle itself. A very satisfactory method of transporting groceries and other articles would be to tow them behind the bicycle in a wheeled cart, but the problems involved in towing a cart over hills, valleys, around corners, etc., have made it difficult to safely and conveniently tow said cart. It is therefore the purpose of this invention to create a structure which will fulfill these requirements.

SUMMARY OF THE INVENTION

The primary object of the present invention is to produce a towing attachment for bicycles which is easily attached and removed from any standard bicycle.

A further object of the present invention is to provide a towing attachment which has universal movement in all directions for travelling over uneven terrain, turning corners, going up and down hills, etc.

A still further object of my invention is to provide a device as described which is foldable when not in use.

Other and further objects will appear in the appended specification and claims.

BRIEF DESCRIPTION OF THE DRAWINGS

FIG. 1 is a perspective view of a bicycle with my towing attachment in operative position, towing a wheeled shopping cart.

FIG. 2 is an enlarged perspective of the towing attachment.

FIG. 3 is a still further enlargement of a portion of the towing attachment taken on the line 3—3 of FIG. 2 showing the ball and socket arrangement.

FIG. 4 is an enlarged view of the pivot means taken on the line 4—4 of FIG. 2.

FIG. 5 shows the device in its fully folded position.

DETAILED DESCRIPTION OF THE DRAWINGS

The numeral 10 represents a standard bicycle, having a front wheel 12, a rear wheel 14, a frame member 16 having an inverted V-shaped rear frame portion comprising arms 18 and 20, a rear mudguard or fender 22 supported by conventional brace members 24 and 26. The present invention consists of a generally U-shaped member 28, having legs thereon passing around the outside of the inverted V-shaped frame portion and held against vertical, horizontal or other movement by a pair of transverse clamping plates 30 and 32. These can be clamped in position by any suitable means such as threading the ends of the U-shaped member and attaching nuts thereon.

Adjacent the bight portion of the U-shaped member 28 and clamped to the legs are braces 34 and 36, which help to hold the U-shaped member 28 immovable.

A clamping member 38, comprising upper member 40, lower member 42 and hinge means 44 is releasably clamped to the bight portion of the U-shaped member 28 by any suitable means, one such means being shown is a bolt 46 pivoted to the member 42 and engaging a slot in the upper member 40, then clamped by a wing nut 48 engaged thereon.

Welded to the clamping member 38 either on the upper member 40 or the lower member 42 is a socket 50, receiving a ball 52 therein, said ball adapted for almost 90° movement in any direction. An "A" frame 54 has a joining portion 56 attached to the ball 52 by a bolt 51 passing through the joining portion 56 and fastened by a nut 53. The remote ends of the legs of the "A" frame are welded to clamping members 58 and 60, of the same type as clamping member 38. These clamping members clamp the handle portion 62 of a wheeled shopping-type cart 64.

To use, the "A" frame member 54 is pivoted downwardly from its folded or inoperative position (as shown in FIG. 5) and assumes a generally planar position in regard to U-shaped member 28. The handle 62 of the cart 64 is then clamped between clamping members 58 and 60 and the cart is ready to be drawn along behind the cyclist. The ball and socket 50 and 52 allow freedom of movement when turning corners, going up and down hills, on rough terrain, etc. A clamping band 55 surrounds the socket 50 to assure the holding of the ball in said socket regardless of extreme shocks and strains which may be placed on said socket during various conditions of use.

It should be understood that a number of modifications and changes in the embodiments discussed herein can be made without departing from the spirit and scope of this invention as defined in the appended claims.

I claim:

1. A device for towing a cart behind a bicycle comprising a U-shaped attaching member having a bight portion and threaded leg portions removably attached to a frame portion and located above a rear wheel of said bicycle, a universally movable connecting means having a clamp at one end with hinged upper and lower members for rotatable attachment to the bight portion of said U-shaped member, an A-shaped frame member having the tip of said A rigidly connected to said universally movable connecting means wherein said A shaped frame member is movable 180 degrees from an extended position to a stored position overlapping said U-shaped attaching member, the legs of said A-shaped frame member terminating in clamping bearing members for movably engaging the handle portion of a cart, and a pair of parallel plates with aligned apertures therein receiving the threaded ends of said leg portions whereby said plates, when positioned on opposite sides of vertical bicycle frame members and bolted thereagainst, will hold the device on said bicycle.

* * * * *